(12) United States Patent
Shibasaki et al.

(10) Patent No.: US 6,225,255 B1
(45) Date of Patent: *May 1, 2001

(54) ADDITIVE CATALYST FOR THE CRACKING OF HEAVY OIL

(75) Inventors: Masato Shibasaki; Nobuo Ootake; Kaori Nakamura, all of Saitama (JP)

(73) Assignee: Exxon Research and Engineering Company, Annandale, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/093,443

(22) Filed: Jun. 8, 1998

(51) Int. Cl.$^7$ .................................................... B01J 23/00
(52) U.S. Cl. ......................... 502/300; 502/240; 502/250; 502/251; 502/302; 502/303; 502/304; 502/340; 502/341; 502/355; 208/106; 208/113; 208/118; 208/119; 208/120; 208/121; 208/122; 208/123; 208/124
(58) Field of Search .................................... 502/300, 302, 502/303, 304, 340, 341, 355, 240, 250, 251; 208/106, 113, 118, 119, 120, 121, 122, 123, 124

(56) References Cited

U.S. PATENT DOCUMENTS

| | | | |
|---|---|---|---|
| 2,378,530 | * 6/1945 | Bailie et al. ........................... 196/52 |
| 3,957,681 | * 5/1976 | Tomita et al. ........................ 252/373 |
| 4,367,165 | * 1/1983 | Asaoka et al. ....................... 252/457 |
| 4,522,937 | * 6/1985 | Yoo et al. ............................. 502/302 |
| 4,636,484 | 1/1987 | Nishimura et al. .................... 502/65 |
| 4,740,292 | * 4/1988 | Chen et al. .......................... 208/120 |
| 4,837,396 | * 6/1989 | Herbst et al. .......................... 502/67 |
| 4,946,814 | 8/1990 | Shi et al. ................................ 502/62 |
| 5,001,097 | 3/1991 | Pecoraro ................................ 502/68 |
| 5,002,653 | 3/1991 | Kennedy et al. .................... 208/118 |
| 5,006,497 | * 4/1991 | Herbst et al. .......................... 502/67 |
| 5,126,296 | * 6/1992 | Han et al. .............................. 502/61 |
| 5,164,073 | 11/1992 | Lam ..................................... 208/120 |
| 5,179,059 | * 1/1993 | Domesle et al. ..................... 502/303 |
| 5,219,814 | * 6/1993 | Kirker et al. .......................... 502/66 |
| 5,364,516 | * 11/1994 | Kumar et al. ........................ 208/120 |
| 5,468,700 | * 11/1995 | Ward .................................... 502/60 |
| 5,741,751 | * 4/1998 | Miller .................................. 502/208 |

FOREIGN PATENT DOCUMENTS

| | | | |
|---|---|---|---|
| 0 083 163B1 | 2/1986 | (EP) | ................. B01J/29/06 |
| 0 568 170 B1 | 11/1995 | (EP) | ................. B01J/23/10 |
| 2138314 | 10/1984 | (GB) | ................. B01J/23/02 |

* cited by examiner

Primary Examiner—Steven P. Griffin
Assistant Examiner—Cam N. Nguyen
(74) Attorney, Agent, or Firm—Henry E. Naylor; Michael A. Cromwell

(57) ABSTRACT

An additive catalyst for the cracking of heavy oil, characterized in that the additive catalyst includes: (i) a mixed metal oxide composed of an acidic metal oxide and a basic metal oxide, in which the proportion of the basic metal oxide is from 5 to 50 mole %, (ii) clay, and (iii) silica.

8 Claims, No Drawings

ADDITIVE CATALYST FOR THE CRACKING OF HEAVY OIL

CROSS REFERENCE TO RELATED APPLICATIONS

This application claims the priority of Japanese Patent Application No. HEI 09-165362 filed Jun. 6, 1997, which is incorporated herein by reference.

FIELD OF THE INVENTION

This invention relates to an additive catalyst for use with a cracking catalyst for cracking heavy oils, especially fluidized catalytic cracking (FCC) catalysts.

BACKGROUND OF THE INVENTION

The term "heavy oil" as used herein means a hydrocarbon oil containing heavy components having boiling points of about 650° F. (343° C.) and higher. Such heavy oils include various crude oils; non-distillates such as atmospheric distillation residues and vacuum distillation residues of such crude oils; solvent-deasphalted oil; solvent-deasphalted oil asphalt; shale oil; tar sand oil; liquefied coal oil; distillates such as HGO (topped heavy gas oil) and VGO (vacuum gas oil); and blends of these distillates and the above-described non- distillates.

A variety of methods are known for obtaining lighter products by cracking a heavier oil. One such method is fluidized catalytic cracking (FCC). A great deal of research has been conducted in FCC to achieve high yields and selectivity. One method for improving the yield of light oil is to use a mixture of an additive that acts to promote the cracking of heavy components in heavy oil, with a conventional cracking catalyst.

Typical FCC catalyst additives include alumina, clay and silica, particularly wherein the ratio of strong acidity to the total acidity is high. Consequently, such additives are accompanied by problems such as the cracking of heavy oil is not adequately promoted, or excessive coke is deposited on the catalyst. Further, additives composed of a composite oxide such as silica-alumina, clay and silica are also known to be effective for the promotion of cracking of heavy oil and for the suppression of deposition of coke. However, they do not make it possible to reduce the ratio of strong acidity to total acidity to or beyond a certain value, and therefore involve problems that a cracking reaction proceeds too much to increase the proportion of naphtha in the cracked product.

An object of the present invention is therefore to provide an additive catalyst for the cracking of heavy oil which: has high cracking activity for heavy components in the heavy oil; which features reduced coke deposition; and which brings about a high naphtha yield.

With a view to attaining the above-described object, the present inventors have proceeded with extensive research, leading to the completion of the present invention.

According to the present invention, there is thus provided an additive catalyst for the cracking of heavy oil (Catalyst I), characterized in that the additive catalyst comprises: (i) a mixed metal oxide composed of an acidic metal oxide and a basic metal oxide, in which the proportion of the basic metal oxide is from 5 to 50 mole %, (ii) clay, and (iii) silica.

The present invention also provides an additive catalyst for the cracking of heavy oil (Catalyst II), characterized in that the additive catalyst comprises: (i) an acidic metal oxide other than silica, or an acidic mixed metal oxide, (ii) clay, (iii) silica, and (iv) a basic metal oxide.

In addition, the present invention further provides an additive catalyst for the cracking of heavy oil (Catalyst III), characterized in that the additive catalyst comprises: (i) an acidic metal oxide other than silica, or an acidic mixed metal oxide, (ii) clay, (iii) silica, and (iv) basic metal cations.

SUMMARY OF THE INVENTION

In accordance with the present invention there is provided an additive catalyst for the cracking of heavy oil, characterized in that said additive catalyst comprises: (i) a mixed metal oxide composed of an acidic metal oxide and a basic metal oxide, in which the proportion of said basic metal oxide is from 5 to 50 mole %, (ii) clay, and (iii) silica.

In a preferred embodiment of the present invention the additive catalyst also includes a basic metal oxide.

In other preferred embodiments of the present invention the additive catalyst is comprised of: (i) an acidic metal oxide other than silica, or an acidic mixed metal oxide, (ii) clay, (iii) silica, and (iv) basic metal cations.

DETAILED DESCRIPTION OF THE INVENTION

The acidic metal oxide employed in the present invention has acidity at a surface thereof when wetted with water. Non-limiting examples include silica ($SiO_2$), alumina ($Al_2O_3$), zirconia ($ZrO_2$), titania ($TiO_2$), and boria ($B_2O_3$). Specific examples of acidic mixed metal oxides which can be used in the practice of the present invention include silica-alumina, silica- zirconia, silica-boria, and alumina-boria.

The basic metal oxide employed in the present invention shows basicity at a surface thereof when wetted with water. Non-limiting examples of such include magnesia (MgO), calcia (CaO), and lanthana ($La_2O_3$).

The content of silica in the silica-containing mixed metal oxides range from about 5 to 30 wt. %, preferably about 10 to 20 wt. %. A silica content higher than this range results in a catalyst with reduced hydrothermal stability, whereas a silica content lower than the above range leads to a catalyst with lower cracking activity for heavy components. With regard to alumina-boria, the content of alumina ranges from about 5 to 95 wt. %, preferably about 10 to 90 wt. %.

It is preferred to use a silica-containing mixed metal oxide having a structure wherein a metal oxide other than silica is contained as a core where silica is adhered as a layer on a surface of said core. With regard to alumina-boria, it is preferred to use one having a structure wherein alumina is a core and boria is adhered as a layer on a surface of said core Examples of clays which are suitable for use in the present invention include kaolin, bentonite and kibushi clay. Preferred is kaolin. In general, a clay containing one or more of the clay minerals: kaolinite, dickite, nacrite, halloysite and hydrated halloysite, as a primary component, is preferred.

A description will hereinafter be made in detail about the above described three types of catalysts additives (hereinafter may be referred to simply as "Catalsyt") I to III according the present invention for the cracking of heavy oil.
Catalyst I Catalyst I according to the present invention is characterized in that it contains, as a catalyst component, a mixed metal oxide composed of an acidic metal oxide and a basic metal oxide and the proportion of the basic metal oxide is from 5 to 50 mole %, preferably from 10 to 40 mole %.

Specific examples of the mixed metal oxide can include $SiO_2/MgO$, $SiO_2/CaO$, $SiO_2/La_2O_3$, $Al_2O_3/MgO$, $Al_2O_3/CaO$, $Al_2O_3/La_2O_3$, $B_2O_3/MgO$, $ZrO_2/CaO$, and $TiO_2/La_2O_3$.

As the mixed metal oxide, it is preferred to use one having a structure wherein an acidic metal oxide is contained as a core and a basic metal oxide is adhered as a layer on a surface of said core.

One preferred method of producing Catalyst I is to add a gel of clay and the mixed metal oxide to a silica sol solution, then uniformly stirring the resulting mixture to prepare a dispersion. In this case, the average particle size of clay is from about 0.5 to 5 μm, preferably from about 2 to 3 μm. The average particle size of the mixed metal oxide is from about 0.1 to 10 μm, preferably from about 3 to 7 μm. Further, the total solid concentration of the dispersion can be from about 10 to 50 wt. %, preferably about 20 to 30 wt. %.

The dispersion prepared as described above is next spray dried at a temperature from about 180 to 300° C., preferably from about 200 to 270° C. By this spray drying, Catalyst I of the present invention is obtained in the form of a powder, the average particle size of which is about 50 to 80 μm, preferably about 55 to 70 μm. The dry product obtained as described above can be used after calcining it at a temperature from about 300 to 700° C., preferably 400 to 600° C., as needed. Moreover, this powdery additive can be formed, if needed, by extrusion or the like into a formed product of a granular, spherical, cylindrical, rod-like or similar shape.

With respect to Catalyst I of the present invention, the content of the mixed metal oxide is from about 5 to 70 wt. %, preferably from about 10 to 60 wt. %, and the content of clay is from about 10 to 70 wt. %, preferably from about 20 to 60 wt. %. The content of silica will range form about 10 to 30 wt. %, preferably from about 15 to 25 wt. %. It is desirable to limit the content of whole silicon other than kaolin, in Catalyst I, to a range of about 10 to 60 wt. %, preferably from about 20 to 50 wt. %, in terms of $SiO_2$. A silicon content higher than the above range results in a catalyst with reduced hydrothermal stability, whereas a silicon content lower than the above range leads to a catalyst with reduced cracking activity for heavy components.

The specific surface area for Catalyst I is from about 30 to 80 $m^2/g$, preferably from about 40 to 60 $m^2/g$. Its overall pore volume is from about 0.14 to 0.45 ml/g, preferably from about 0.20 to 0.40 ml/g. The pore volume of pores having radii of 60 Å and smaller (micropore volume) may be 0.05 ml/g or smaller, preferably 0.04 ml/g or smaller. In addition, the total acidity may be from about 0.02 to 0.08 mmol/g, preferably from about 0.025 to 0.060 mmol/g, and the percentage of the strong acidity based on the total acidity may be from 10 to 50%.

Catalyst I of the present invention shows tendency that its total acidity becomes greater as its specific surface area increases. If the total acidity exceeds the above-described range, however, no effects can be obtained practically for a heavy-oil- cracking catalyst from the addition of the catalyst I, thereby failing to show substantial improvements in conversion, naphtha yield and LCO (light cycle oil) yield compared with the single use of the heavy-oil-cracking catalyst.

Further, if the percentage of the strong acidity exceeds the above-described range in Catalyst I, use of Catalyst I results in an increase in the amount of deposited coke. If the percentage of the strong acidity becomes smaller than the above-described range, on the other hand, catalytic activities are deteriorated. Control of the strong acidity can be achieved by varying the composition of the catalyst components, the production conditions of the catalyst, and the like.

Catalyst II

Catalyst II of the present invention is characterized by a structure wherein a basic metal oxide is additionally included in a conventionally known catalyst composed of an acidic metal oxide other than silica or an acidic mixed metal oxide, clay and silica.

The content of the acidic metal oxide or acidic mixed metal oxide of Catalyst II is from about 10 to 60 wt. %, preferably about 20 to 50 wt. %. The content of clay may range from 20 to 60 wt. %, preferably from 30 to 50 wt. %. The content of silica may be from 15 to 40 wt. %, preferably from 20 to 30 wt. %. The content of the basic metal oxide may range from 5 to 50 mole %, preferably from 10 to 40 mole % based on the acidic metal oxide or acidic mixed metal oxide. In the catalyst II of the present invention, it is desired to limit the content of whole silicon other than kaolin to a range of from 10 to 60 wt. %, preferably from 20 to 50 wt. % in terms of $SiO_2$. A content of the whole silicon higher than the above range results in a catalyst with reduced hydrothermal stability, whereas a content of the whole silicon lower than the above range leads to a catalyst with reduced cracking activity for heavy components.

Also with respect to Catalyst II, the specific surface area may be from 30 to 80 $m^2/g$, preferably from 40 to 60 $m^2/g$. Its overall pore volume may range form 0.14 to 0.45 ml/g, preferably from 0.20 to 0.40 ml/g. The pore volume of pores having radii of 60 Å and smaller (micropore volume) may be 0.05 ml/g or smaller, preferably 0.04 ml/g or smaller. In addition, the total acidity may be from 0.02 to 0.08 mmol/g, preferably from 0.025 to 0.060 mmol/g, and the percentage of the strong acidity based on the total acidity may be from 10 to 50%, preferably from 20 to 45%.

As the total acidity of Catalyst II becomes greater its specific surface area increases. If the total acidity exceeds the above-described range, however, no effects can be obtained practically for a heavy-oil- cracking catalyst from the addition of the catalyst, thereby failing to show substantial improvements in conversion, naphtha yield and LCO (light cycle oil) yield compared with the single use of the heavy-oil-cracking catalyst. Further, if the percentage of the strong acidity exceeds the above-described range, the coke-formation preventing effect of the catalyst II according to the present invention becomes insufficient. If the percentage of the strong acidity becomes smaller than the above-described range, on the other hand, catalytic activities are lowered.

Catalyst II can be produced by the following various processes:

(1) The acidic metal oxide other than silica or the acidic mixed metal oxide, clay and silica and the basic metal oxide are uniformly mixed in water, and the resulting slurry is then spray dried.

(2) Particles of the basic metal oxide are added and mixed with an aqueous solution of the acidic metal oxide other than silica or the acidic mixed metal oxide, clay and silica, and forming is then conducted using the resultant mixture as a forming material.

(3) A catalyst—which is composed of the acidic metal oxide other than silica or the acidic mixed metal oxide, clay and silica—is impregnated with an aqueous solution of a water-soluble salt of at least one basic metal selected from alkaline earth metals and rare earth metals, and the thus-impregnated catalyst is then dried and calcined. In the catalyst II of this invention obtained by this process the basic metal exists in the form of an oxide in the catalyst.

Catalyst III

Catalyst III of the present invention is characterized by a structure wherein basic metal cations are additionally included in a conventionally known catalyst composed of an acidic metal oxide other than silica or an acidic mixed metal oxide, clay and silica.

The content of the acidic metal oxide or acidic mixed metal oxide of Catalyst III may be from 10 to 60 wt. %, preferably 20 to 50 wt. %. The content of clay may range from 20 to 60 wt. %, preferably from 30 to 50 wt. %. The content of silica may be from 15 to 40 wt. %, preferably from 20 to 30 wt. %. The content of the basic metal cations may range, in terms of their metal oxide, from 5 to 50 mole %, preferably from 10 to 40 mole % based on the acidic metal oxide or acidic mixed metal oxide. In the catalyst III of the present invention, it is desired to limit the content of the whole silicon to a range of from 10 to 60 wt. %, preferably from 20 to 50 wt. % in terms of $SiO_2$. A content of the whole silicon higher than the above range results in a catalyst with reduced hydrothermal stability, whereas a content of the whole silicon lower than the above range leads to a catalyst with reduced cracking activity for heavy components.

Also with respect to Catalyst III, the specific surface area may be from 30 to 80 $m^2/g$, preferably from 40 to 60 $m^2/g$. Its overall pore volume may range form 0.14 to 0.45 ml/g, preferably from 0.20 to 0.40 ml/g. The pore volume of pores having radii of 60 Å and smaller (micropore volume) may be 0.05 ml/g or smaller, preferably 0.04 ml/g or smaller. In addition, the total acidity may be from 0.02 to 0.065 mmol/g, preferably from 0.025 to 0.060 mmol/g, and the percentage of the strong acidity based on the total acidity may be from 10 to 50%, preferably from 20 to 45%.

As the total acidity of Catalyst III becomes greater its specific surface area increases. If the total acidity exceeds the above-described range, however, no effects can be obtained practically for a heavy- oil-cracking catalyst from the addition of the catalyst I, thereby failing to show substantial improvements in conversion, naphtha yield and LCO (light cycle oil) yield compared with the single use of the heavy-oil-cracking catalyst. Further, if the percentage of the strong acidity exceeds the above-described range, the coke- formation preventing effect of the catalyst according to the present invention becomes insufficient. If the percentage of the strong acidity becomes smaller than the above-described range, on the other hand, catalytic activities are lowered.

Catalyst III of the present invention can be prepared by a process, which comprises bringing an aqueous solution of a water-soluble salt of at least one basic metal, which is selected from alkaline earth metals and rare earth metals, into contact with a catalyst, which is composed of the acidic metal oxide other than silica or the acidic mixed metal oxide, clay and silica, to have ions of the basic metal included in the catalyst by an ion exchange, and then drying the resultant catalyst. In the catalyst III of this invention obtained by this process the basic metal exists in the form of cations in the catalyst.

Incidentally, the specific surface area, the total acidity and the strong acidity referred to in connection with each catalyst, metal oxide or the like in the present invention were obtained as will be described hereinafter.

A sample (0.2 g) was maintained for 1 hour under the conditions of 200° C. and 1×10−3 torr and was then allowed to adsorb nitrogen gas at the liquid nitrogen temperature (77K). Using the quantity of nitrogen gas so adsorbed, the specific surface area was determined. The BET method was used for the calculation of the specific surface area.

A sample (0.5 g) was maintained for 4 hours under the conditions of 400° C. and 1×10−4 torr and was then allowed to adsorb ammonia gas. Heat of adsorption produced during the adsorption was measured. From the measurement results, the total acidity and the strong acidity were calculated. In this case, the quantity of adsorbed ammonia corresponding to the heat of adsorption in excess of 70 KJ/mol was defined as the total acidity, while the acidity corresponding to the heat of adsorption in excess of 95 KJ/mol was defined as the strong acidity. Incidentally, the measurement was performed using an "Adsorption Heat Measuring Instrument" manufactured by K.K. Tokyo Riko.

The values of the above-described physical properties of each catalyst according to the present invention can be controlled depending on conditions for its production. For example, the specific surface area can be controlled depending on the specific surface area or particle size of a metal oxide to be used, while the total acidity can be controlled in accordance with the specific surface area. The strong acidity can be controlled according to the composition and production conditions of the catalyst.

The catalyst according to the present invention can be used by dispersing it in the form of fine powder in heavy oil. As an alternative, it can be employed by mixing the same in a conventionally known cracking catalyst for heavy oil. Preferably, the catalyst of the present invention can be used by mixing it in the form of powder in an FCC catalyst. An FCC catalyst is composed of a porous inorganic oxide and zeolite. Usable examples of the porous inorganic oxide can include silica-alumina, silica-zirconia, and silica magnesia. The catalyst according to the present invention can preferably be applied to FCC catalysts, especially, those composed of zeolite, silica, alumina and kaolin. The content of the catalyst of this invention in each FCC catalyst may range from 2 to 30 parts by weight, preferably form 4 to 20 parts by weight per 100 parts by weight of the FCC catalyst.

Each additive according to the present invention has high cracking activity for heavy components in heavy oil, especially for heavy components having boiling points of 650° F. and higher, can produce light oils having boiling points of 650° F. and lower (naphtha and LCO) at high yields, and, moreover, can effectively suppress the deposition of coke.

The following examples are presented for illustrative purposes only.

EXAMPLES

The present invention will next be described in further detail by Examples.

Example 1

The following mixed metal oxides, each of which was composed of the corresponding acidic metal oxide and basic metal oxide, were provided.

(1) $SiO_2$—MgO
   MgO content: 70 wt. %
(2) $SiO_2$—$La_2O_3$
   $La_2O_3$ content: 70 wt. %
(3) ($Al_2O_3$—$La_2O_3$) $Al_2O_3$—SrO
   $La_2O_3$ content: 26 wt. %
(4) ($Al_2O_3$—CaO) $Al_2O_3$—$La_2O_3$
   CaO content: 6 wt. %

2 N sulfuric acid was added to 660 g of an aqueous solution of water glass (pH 12), which had an SiO2 content of 15.2 wt. %, so that the pH was adjusted to 3 to obtain a silica sol solution.

Catalysts A to B of 60 µm in average particle size were each obtained by adding 100 g of kaolin and 300 g, in terms of dry weight, of a gel of the corresponding mixed metal oxide to 1,180 g of the silica sol solution, uniformly dispersing the resultant mixture, and then spray drying the thus-prepared dispersion. Further, catalysts C to D of 60 µm in average particle size were each also obtained by adding 250 g of kaolin and 150 g, in terms of dry weight, of a gel of the corresponding mixed metal oxide to 1,180 g of the silica sol solution, uniformly dispersing the resultant mixture, and then spray drying the thus prepared dispersion. The compositions and physical properties of these catalysts A to D are presented in Table 1.

Comparative Example 1

A catalyst E was obtained in a similar manner as in Example 1 except for the use of 225 g of $SiO_2$—$Al_2O_3$ (silica content: 10 wt. %) as a mixed metal oxide and 200 g of kaolin.

The composition and physical properties of this catalyst E are also presented in Table 1.

TABLE 1

| Catalyst | | A | B | C | D | E* |
|---|---|---|---|---|---|---|
| $SiO_2$ content other than kaolin (as $SiO_2$) (wt. %) | | 33 | 33 | 40 | 40 | 33 |
| | Mixed metal oxide | $SiO_2$— MgO (1) | $SiO_2$— $La_2O_3$ (2) | $Al_2O_3$— SrO (3) | $Al_2O_3$— $La_2O_3$ (4) | $SiO_2$— $Al_2O_3$ |
| Composition (wt. %) | Mixed Metal Oxide | 60 | 60 | 30 | 30 | 45 |
| | Kaolin | 20 | 20 | 50 | 50 | 40 |
| | Silica | 20 | 20 | 20 | 20 | 15 |
| Physical Properties | | | | | | |
| Specific surface area ($m^2$/g) | | 37 | 33 | 32 | 31 | 59 |
| Total acidity (mmol/g) | | 0.023 | 0.021 | 0.022 | 0.024 | 0.062 |
| Percentage of strong acidity (%) | | 37 | 40 | 47 | 45 | 55 |

*Comparative Example

Example 2

2 N sulfuric acid was added to 660 g of an aqueous solution of water glass (pH 12), which had an $SiO_2$ content of 15.2 wt. %, so that the pH was adjusted to 3 to obtain a silica sol solution.

Next, catalysts F to I of 60 μm in average particle size were each obtained by adding 250 g of kaolin and 300 g of alumina and also the nitrate of a corresponding basic metal at a molar ratio of 1/9 to the alumina, as calculated in terms of the oxide of the basic metal oxide, to 1,180 g of the silica sol solution, uniformly dispersing the resultant mixture, and then spray drying the thus-prepared dispersion. The compositions and physical properties of these catalysts F to I are presented in Table 2.

TABLE 2

| Catalyst | | F | G | H | I |
|---|---|---|---|---|---|
| $SiO_2$ content other than kaolin (as $SiO_2$) (wt. %) | | 40 | 40 | 40 | 40 |
| | Basic metal oxide | SrO | CaO | $La_2O_3$ | BaO |
| Composition (wt. %) | Basic Metal Oxide | 3 | 1.7 | 7.9 | 4.3 |
| | Alumina | 27 | 28.3 | 22.1 | 25.7 |
| | Kaolin | 50 | 50 | 50 | 50 |
| | Silica | 20 | 20 | 20 | 20 |
| Physical Properties | | | | | | 
| Specific surface area ($m^2$/g) | | 53 | 57 | 50 | 51 |
| Total acidity (mmol/g) | | 0.05 | 0.051 | 0.055 | 0.033 |

TABLE 2-continued

| Catalyst | F | G | H | I |
|---|---|---|---|---|
| Percentage of strong acidity (%) | 32 | 29 | 45 | 37 |

Example 3

2 N sulfuric acid was added to 660 g of an aqueous solution of water glass (pH 12), which had an $SiO_2$ content of 15.2 wt. %, so that the pH was adjusted to 3 to obtain a silica sol solution.

Next, particles (N) and (O) of 60 μm in average particle size were each obtained by adding 100 g of kaolin, 300 g of alumina or the silica-alumina, which was described in Example 1, to 1,180 g of the silica sol solution, uniformly dispersing the resultant mixture, and then spray drying the thus-prepared dispersion.

Then, catalysts J to M were each obtained by immersing 100 g of the corresponding particles (N) or (O) in 1 l of an aqueous solution, which contained the nitrate of the corresponding basic metal at a concentration of 0.2 N, at 30° C. for 5 hours, drying the thus-immersed particles at 120° C. and then calcining the resultant particles at 500° C.

The compositions and physical properties of these catalysts are presented in Table 3.

Comparative Examples 2 & 3

The particles (N) and (O) described in Example 3 were provided as a comparative catalyst (N*) and a comparative catalyst (O*). Their compositions and physical properties are presented in Table 3.

TABLE 3

| Catalyst | | J | K | L | M | N* | O* |
|---|---|---|---|---|---|---|---|
| $SiO_2$ content other than kaolin (as $SiO_2$) (wt. %) | | 20 | 20 | 26 | 26 | 20 | 26 |
| | Oxide | $Al_2O_3$ | $Al_2O_3$ | $SiO_2$— $Al_2O_3$ | $SiO_2$— $Al_2O_3$ | $Al_2O_3$ | $SiO_2$— $Al_2O_3$ |
| | Basic metal | La | Mg | La | Mg | — | — |
| Composition (wt. %) | Oxide | 53.2 | 58.4 | 53.2 | 58.3 | 60 | 60 |
| | Basic metal | 6.8 | 1.6 | 6.8 | 1.6 | 0 | 0 |
| | Kaolin | 20 | 20 | 20 | 20 | 20 | 20 |
| | Silica | 20 | 20 | 20 | 20 | 20 | 20 |
| Physical Properties | | | | | | | |
| Specific surface area ($m^2$/g) | | 80 | 77 | 100 | 102 | 79 | 104 |
| Total acidity (mmol/g) | | 0.06 | 0.065 | 0.1 | 0.12 | 0.063 | 0.11 |
| Percentage of strong acidity (%) | | 47 | 45 | 40 | 38 | 60 | 49 |

*Comparative Examples

Application Example 1

To conduct performance tests of the additive catalysts A to E shown in Table 1, the individual catalysts A to E were uniformly mixed in portions of an FCC catalyst. Using a microactivity test (MAT) apparatus, predetermined amounts of a feed heavy oil were respectively subjected to a fluidized catalytic cracking reaction in the presence of the thus-prepared catalyst mixtures under the same conditions.

The catalysts A to E were each added the corresponding portions of the FCC catalyst in a proportion of 10 parts by weight per 100 parts by weight of the FCC catalyst. The results of the test are presented in Table 4. For the sake of a comparison, a similar test was also performed without addition of any one of the additive catalysts.

As the feed heavy oil, desulfurized VGO was used. Further, prior to the test, the catalyst mixtures composed of the FCC catalyst and the respective additive catalysts were calcined at 650° C. for 1 hour and were then treated at 760° C. for 16 hours in a 100% steam atmosphere.

The fluidized catalytic cracking conditions in the above-described tests were as follows:

(1) Reaction temperature: 520° C.
(2) Reaction pressure: atmospheric pressure
(3) Catalyst/oil ratio: 2.5 to 4.5 wt/wt
(4) WHW: 32 hr$^{-1}$ Using as references the results of the reaction conducted in the presence of the same FCC catalyst without addition of any additive catalyst, the values shown in Table 4 were all obtained by subtracting reference values from the results of the respective reactions conducted in the presence of the catalyst compositions making use of the individual additive catalysts. Further, the performance values other than the conversions are values obtained at the same conversion. These definitions will apply equally in Tables 5 and 6.

(1) Conversion (wt. %)=(A−B)/A−100
  A: Weight of the feed oil.
  B: Weight of distillates contained in the produced oil and having boiling points of 221° C. and higher.
(2) Naphtha yield (wt. %)=C/A×100
  C: Weight of naphtha (boiling point range: $C_5$ to 221° C.) in the produced oil.
(3) Bottom yield (wt. %)=D/A×100
  D: Weight of a bottom (boiling point range: 343° C. and higher) in the produced oil.
(4) Coke yield (wt. %)=E/A×100
  E: Weight of coke deposited on the catalyst mixture.

TABLE 4

| Catalyst Mixture<br>Additive Catalyst | (1)<br>A | (2)<br>B | (3)<br>C | (4)<br>D | (5)<br>E |
|---|---|---|---|---|---|
| Reaction results | | | | | |
| Conversion (wt. %) | +2.2 | +1.0 | +1.7 | +1.1 | +1.5 |
| Naphtha yield (wt. %) | +1.5 | +1.3 | +0.6 | +0.7 | +0.4 |
| Bottom yield (wt. %) | −0.5 | −0.6 | −0.2 | −0.3 | −1.2 |
| Coke yield (wt. %) | −0.4 | −0.3 | −0.3 | −0.4 | −0.2 |

*Comparative Example

Application Example 2

Experiments were conducted in a similar manner as in Application Example 1 except that the additive catalysts F to H shown in Table 2 were used instead of the additive catalysts A to E.

The results are presented in Table 5.

TABLE 5

| Catalyst Mixture<br>Additive Catalyst | (21)<br>F | (22)<br>G | (23)<br>H | (24)<br>I | (5) *<br>E |
|---|---|---|---|---|---|
| Reaction results | | | | | |
| Conversion (wt. %) | +2.9 | +2.0 | +2.5 | +1.9 | +1.5 |
| Naphtha yield (wt. %) | +1.5 | +1.3 | +0.6 | +0.7 | +0.4 |
| Bottom yield (wt. %) | −0.5 | −0.6 | −0.2 | −0.3 | −1.2 |
| Coke yield (wt. %) | −0.4 | −0.3 | −0.3 | −0.4 | −0.2 |

* Comparative Example

Application Example 3

Experiments were conducted in a similar manner as in Application Example 1 except that the additive catalysts J to O shown in Table 3 were used instead of the additive catalysts A to E. The results are presented in Table 6.

TABLE 6

| Catalyst Mixture<br>Additive Catalyst | (31)<br>J | (32)<br>K | (33)<br>L | (34)<br>M | (35) *<br>N | (36) *<br>O |
|---|---|---|---|---|---|---|
| Reaction results | | | | | | |
| Conversion (wt. %) | +1.4 | +1.7 | +3.5 | +3.3 | +2.0 | +4.3 |
| Naphtha yield (wt. %) | +1.0 | +1.2 | +0.7 | +0.8 | +0.8 | +0.4 |
| Bottom yield (wt. %) | −0.6 | −0.5 | −0.5 | −0.4 | −0.1 | −0.9 |
| Coke yield (wt. %) | −0.3 | −0.3 | −0.4 | −0.4 | −0.1 | −0.2 |

* Comparative Examples

What is claimed is:

1. An additive catalyst for the cracking of heavy oil, comprising:
  (i) a mixed metal oxide comprising an acidic metal oxide forming a core and 5 to 50 mol. % of a basic metal oxide, said basic metal oxide forming a layer over said core of said acidic metal oxide,
  (ii) clay, and
  (iii) silica, wherein the total amount of silica is between 10 and about 60 wt. % based on the total weight of the catalyst.

2. The additive catalyst of claim 1 wherein the acidic metal oxide is selected from the group consisting of alumina, zirconia, titania, and boria.

3. The additive catalyst of claim 2 wherein the acidic metal oxide is alumina.

4. The additive catalyst of claim 3 wherein the basic metal oxide is selected from the group consisting of magnesia, calcia, and lanthana.

5. The additive catalyst of claim 2 wherein the mixed metal oxide is selected from the group consisting of alumina-magnesia, alumina-calcia, alumina-lanthana, boria-magnesia, zirconia-calcia, and titania-lanthana.

6. The additive catalyst of claim 1 wherein the structure of the mixed metal oxide contains a core comprised of the acidic metal oxide on top of which there is adhered the basic metal oxide.

7. The additive catalyst of claim 1 wherein the mixed metal oxide comprises from about 5 to 70 wt. % of the total weight of said additive catalyst.

8. The additive catalyst of claim 1 wherein the acidic mixed metal oxide comprises from about 10 to 60 wt. % of the total weight of said additive catalyst.

* * * * *